(12) United States Patent (10) Patent No.: US 7,068,447 B2
Adachi (45) Date of Patent: Jun. 27, 2006

(54) IMAGING LENS

(75) Inventor: Nobuyuki Adachi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/495,753

(22) PCT Filed: Oct. 3, 2003

(86) PCT No.: PCT/JP03/12735

§ 371 (c)(1),
(2), (4) Date: May 27, 2004

(87) PCT Pub. No.: WO2004/034118

PCT Pub. Date: Apr. 22, 2004

(65) Prior Publication Data

US 2004/0263995 A1 Dec. 30, 2004

(30) Foreign Application Priority Data

Oct. 8, 2002 (JP) ............................. 2002-295292

(51) Int. Cl.
*G02B 9/12* (2006.01)
*G02B 9/60* (2006.01)
(52) U.S. Cl. ...................... 359/784; 359/689; 359/680; 359/770
(58) Field of Classification Search ................ 359/784, 359/781, 782, 783, 680, 681, 682, 686, 689, 359/772, 773
See application file for complete search history.

(56) References Cited

U.S. PATENT DOCUMENTS

| 5,805,350 | A | * | 9/1998 | Yamamoto | 359/686 |
| 6,052,234 | A | | 4/2000 | Mukai et al. | 359/643 |
| 6,075,653 | A | * | 6/2000 | Narimatsu et al. | 359/686 |
| 6,317,270 | B1 | * | 11/2001 | Nagaoka | 359/684 |
| 6,606,201 | B1 | * | 8/2003 | Hirose | 359/686 |
| 2003/0210471 | A1 | * | 11/2003 | Mihara et al. | 359/691 |

FOREIGN PATENT DOCUMENTS

| JP | 5-323190 | 12/1993 |
| JP | 7-120678 | 5/1995 |
| JP | 2000-330024 | 11/2000 |
| WO | 92/21048 | 11/1992 |
| WO | 96/19749 | 6/1996 |

* cited by examiner

*Primary Examiner*—Timothy Thompson
(74) *Attorney, Agent, or Firm*—Oblon, Spivak, McClelland, Maier & Neustadt, P.C.

(57) ABSTRACT

The pickup lens (1) employing the present invention includes a first lens group (11) having negative power, a diaphragm (12), a second lens group (13) having positive power, and a third lens group (14) having negative power, which are arranged in this order from the side of a subject. When varying optical power, in the pickup lens (1), the first lens group (11) is fixed, and the second lens group (13) is moved along the optical axis together with the diaphragm (12), and the third lens group (14) is moved along the optical axis to correct movement of the image point due to variation of optical power.

12 Claims, 24 Drawing Sheets

IMAGING LENS

TECHNICAL FIELD

The present invention relates to a pickup lens, and more particularly, to a pickup lens that is of at least triple lens group configuration whose optical power is variable.

This application claims priority of Japanese Patent Application No. 2002-295292, filed on Oct. 8, 2002, the entirety of which is incorporated by reference herein.

BACKGROUND ART

Up to now, there have been widely used a large variety of information equipments that are provided with a pickup unit using a photoelectric conversion device such as a C-MOS (Complementary Metal Oxide Semiconductor) or a CCD (Charge Coupled Device) as an image pickup device that converts light coming from a pickup lens to electronic signals to output thus generated electronic signals.

Among those information equipments, portable small-sized information equipments, which are intended for mobile use, are desired to make their pickup lens and image pickup device smaller with high pickup performance of their pickup unit maintained and to have an optical zoom in view of their purpose of use. For example, a digital camera and a portable radiotelephone equipment or a cellular phone having a camera built therein are required to have a pickup lens provided with optical zoom function. Moreover, such a pickup lens is required to reduce the length on the optical axis from a lens surface closest to a subject to be shot to the light-receiving surface of an image pickup device, that is, the entire length of a pickup lens. Furthermore, miniaturization of an image pickup device as well as high resolution are required.

Since optical power or optical magnification of above-described pickup lens provided with optical zoom function is variable, one lens group among plural lens groups is moved along the optical axis. For example, as for a pickup lens of triple lens group configuration, when varying optical power, the second lens group on the optical path works as a power-varying lens or a lens to vary optical power, and is moved along the optical axis.

As a pickup lens provided with optical zoom function for use in above-described information equipments, there is disclosed a pickup lens of triple lens group configuration provided with optical zoom function that has lens groups having power in the order of negative, positive, positive on the optical path from a subject to be shot in Japanese Laying-Open Patent 2002-55278.

Furthermore, as a pickup lens for use in above-described information equipments, there is disclosed a pickup lens of quadruple lens group configuration provided with optical zoom function that has lens groups having power in the order of negative, positive, positive, positive on the optical path from a subject to be shot in Japanese Laying-Open Patent 2002-72095.

As for the pickup lens disclosed in Japanese Laying-Open Patent 2002-55278, the entire length is too long when built in an information equipment, and the first lens group is moved when varying optical power, which leads to complicated mechanical design and difficulty in realizing low cost. In such a pickup lens, since a lens group closest to a subject to be shot is moved, a lens frame has to be drawn out from the main equipment body for zooming, there is a fear that an information equipment may be broken due to drop impact or contact with other objects.

On the other hand, even if the pickup lens disclosed in Japanese Laying-Open Patent 2002-72095 is desirable in crashworthiness from a point of view that a lens group closest to a subject to be shot is fixed when varying optical power, since the last lens group is positive, it is difficult to reduce the back focal distance, which leads to difficulty in miniaturizing an information equipment.

DISCLOSURE OF THE INVENTION

Accordingly, the present invention has an object to overcome the above-mentioned drawbacks of the prior art by providing a new pickup lens.

The present invention has another object to provide a small-sized pickup lens having desirable high resolution that can properly correct optical aberrations and can form a bright subject image, and is properly used in small-sized information equipments.

The above object can be attained by providing a pickup lens that takes in light coming from the side of a subject and sends out the light to the side of an image to form a subject image, whose optical power is variable, including:

a first lens group being a meniscus lens having negative power, which is fixed when varying optical power;

a second lens group having positive power, which is moved over a distance along the optical axis from the image side or the wide-angle end to the subject side or the telephoto end when varying optical power; and a third lens group having negative power, which is moved along the optical axis when varying optical power;

wherein the first lens group, the second lens group, and third lens group are arranged in this order from the subject side to the image side, and a diaphragm, which is moved together with the second lens group, is arranged between the first lens group and the second lens group or between the second lens group and third lens group.

The pickup lens according to the present invention is of triple lens group configuration that has lens groups having power in the order of negative, positive, negative. When varying optical power, since the diaphragm is moved along the optical axis together with the power-varying lens, optical aberrations can be properly corrected and a bright subject image can be formed.

These objects and other objects, features and advantages of the present invention will become more apparent from the following detailed description of the preferred embodiments of the present invention.

BEST MODE FOR CARRYING OUT THE INVENTION

The present invention will further be described below concerning the best modes for carrying out the present invention with reference to the accompanying drawings.

The pickup lens employing the present invention is a zoom lens that has its subject side lens group, or a lens group that is arranged most closely to a subject to be shot, fixed therein. The pickup lens is used in small-sized information equipments, in particular, in a digital camera or a portable information equipment having a small-sized image pickup device. Furthermore, the pickup lens employing the present invention is a small-sized zoom lens of triple lens group configuration whose entire length is short.

FIRST EMBODIMENT

Next, as the first embodiment of the present invention, a pickup lens 1 will be explained referring to FIG. 1 to FIG. 3.

Figure 1:
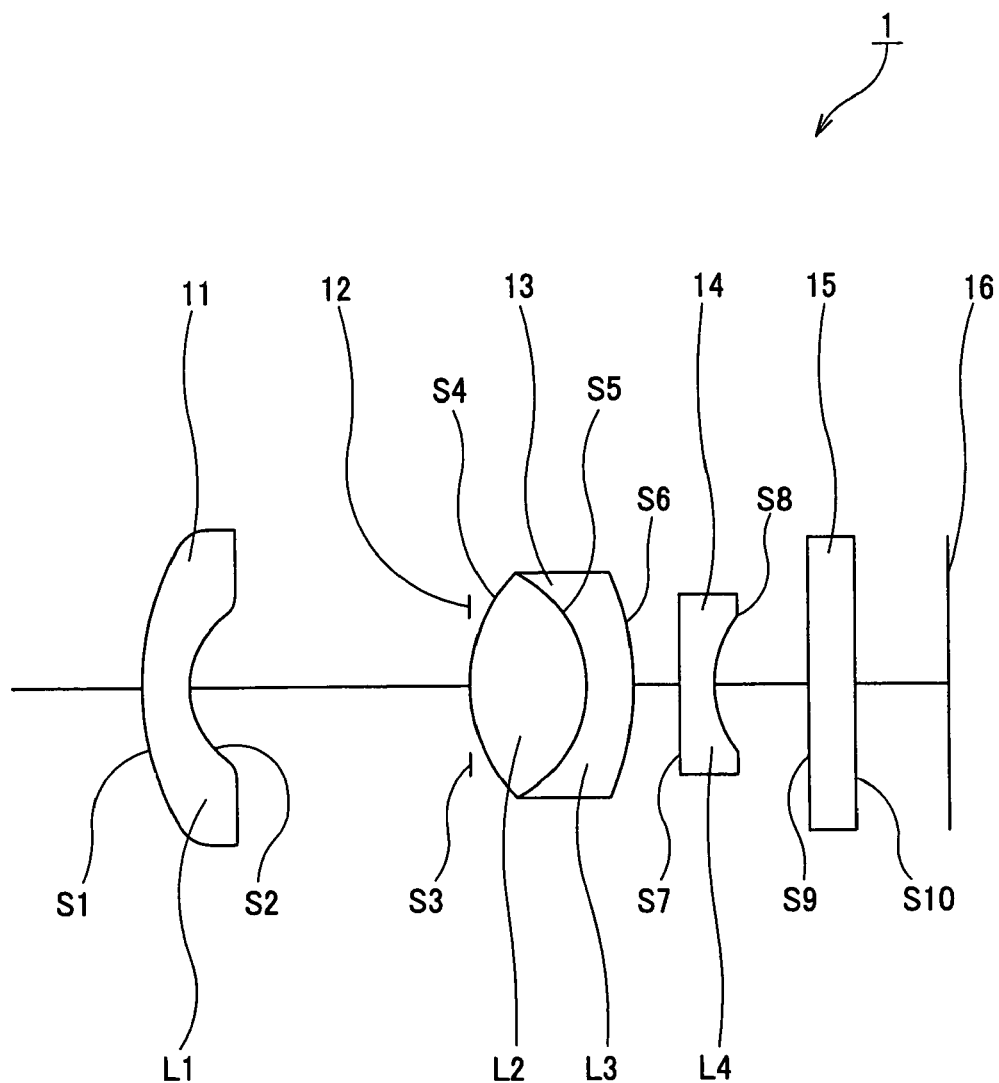
FIG. 1 shows a side view for explaining a zoom lens of the first embodiment employing the present invention, in which a power-varying lens is located at wide-angle end.
Figure 2:
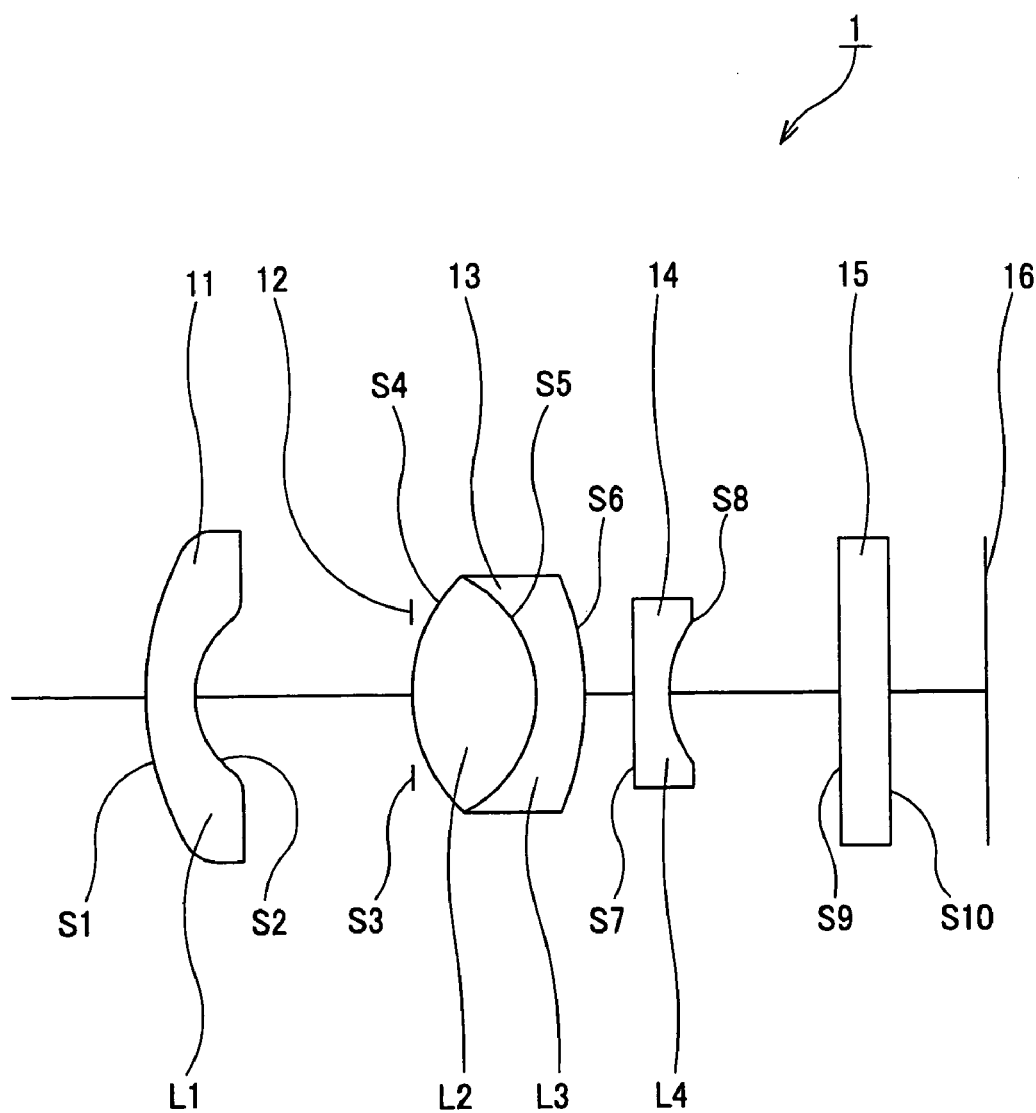
FIG. 2 shows a side view for explaining the zoom lens of the first embodiment, in which a power-varying lens is located between wide-angle end and telephoto end.
Figure 3:
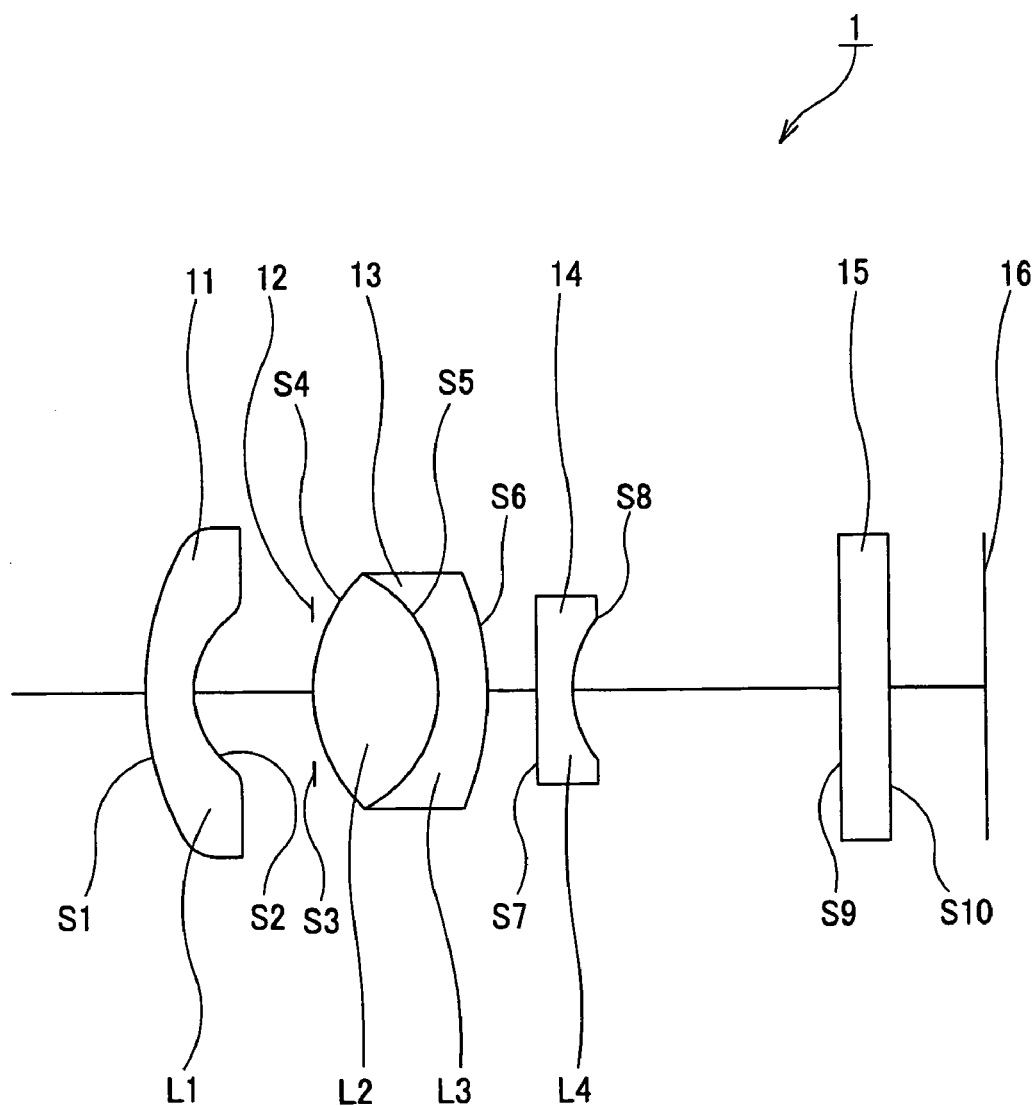
FIG. 3 shows a side view for explaining the zoom lens of the first embodiment, in which a power-varying lens is located at telephoto end.

The pickup lens 1 includes a first lens group 11 having negative power, a diaphragm 12, a second lens group 13 having positive power, and a third lens group 14 having negative power, which are arranged in this order from the side of a subject, as shown in FIG. 1 to FIG. 3.

The pickup lens 1 causes light coming into the first lens group 11 to pass through the diaphragm 12, the second lens group 13, and the third lens group 14 in this order, and condenses the light onto a pickup plane of an image pickup device 16 arranged on the side of an image through a filter 15 to be described later. The image pickup device 16 may be a CCD that converts light condensed by the pickup lens 1 to electronic signals to output thus generated electronic signals.

Specifically, the first lens group 11 is a meniscus lens L1 having negative power whose convex surface faces the subject side.

The diaphragm 12 is fixed to the subject side of the second lens group 13 so that the diaphragm 12 is moved along the optical axis together with the second lens group 13.

The second lens group 13 has a lens L2 whose both surfaces are convex and a meniscus lens L3 having negative power whose convex surface faces the image side. The lens L2 and the meniscus lens L3 are cemented to form a cemented lens.

The third lens group 14 is a lens L4 having negative power.

Thus configured pickup lens 1 causes light coming from the subject side to pass through the first lens group 11, the diaphragm 12, the second lens group 13, and the third lens group 14 in this order, and forms an image of a subject on a pickup plane of the image pickup device 16 through the filter 15.

Thus configured pickup lens 1 can have its optical power varied by moving the second lens group 13 along the optical axis. Specifically, when lowering the optical power of the pickup lens 1, that is, shortening the focal length "f", the second lens group 13 is moved to the image side together with the diaphragm 12, as shown in FIG. 1. When the optical power of the pickup lens 1 is made lowest, the focal length "f" is set to be 2.5 mm, and thus set up position of the second lens group 13 is referred to as wide-angle end.

On the other hand, when raising the optical power of the pickup lens 1, that is, elongating the focal length "f", the second lens group 13 is moved to the subject side together with the diaphragm 12, as shown in FIG. 3. When the optical power of the pickup lens 1 is made highest, the focal length "f" is set to be 7.0 mm, and thus set up position of the second lens group 13 is referred to as telephoto end.

When the optical power of the pickup lens 1 is made between the cases shown in FIG. 1 and FIG. 3, that is, when the focal length "f" is set to be between 2.5 mm and 7.0 mm, the second lens group 13 is moved between the wide-angle end and the telephoto end together with the diaphragm 12, as shown in FIG. 2. As an example of the case in which the optical power of the pickup lens 1 is made between the cases shown in FIG. 1 and FIG. 3, FIG. 2 shows an example in which the focal length "f" is set to be 4.0 mm.

The filter 15 is arranged as a substitute for a low-pass filter or a lid glass of an image pickup device. That is, in case the pickup lens 1 is built in a small-sized information equipment for actual use, a low-pass filter or a lid glass of an image pickup device is arranged between the third lens group 14 and a pickup plane of the image pickup device 16.

Accordingly, in the embodiment, at the time of designing the pickup lens 1, the filter 15 made of glass material corresponding to BK7 (trade name) produced by OHARA INC. is arranged near the focal point so as to take the effect of the low-pass filter or a lid glass of the image pickup device 16 into consideration.

Above-described pickup lens 1 is so configured as to meet the following conditions indicated by mathematical formulas (1) to (5), in which "ft" indicates the focal length when the optical power is highest, that is, when the second lens group 13 is located at the telephoto end on the optical axis, "δV" indicates the difference between the Abbe's numbers of the lens L2 and the lens L3 used in the second lens group 13, "f1" indicates the focal length of the first lens group 11, "f2" indicates the focal length of the second lens group 13, "fw" indicates the focal length when the optical power is lowest, that is, when the second lens group 13 is located at the wide-angle end on the optical axis, "M3" indicates the optical power of the third lens group 14, "TT" indicates the distance from the subject side surface of the lens L1 of the first lens group 11 to the Gaussian image point, and "Z" indicates the zoom ratio "ft/fw" of the lowest optical power and the highest optical power.

$$0.7 \leq TT/Z/fw \leq 1.4 \quad (1)$$

$$0.05 \leq f2/ft \leq 3.6 \quad (2)$$

$$15 \leq \delta V \quad (3)$$

$$0.8 \leq |f1/fw| \leq 10.3 \quad (4)$$

$$1.3 \leq M3 \leq 4.3 \quad (5)$$

Next, the conditions indicated by mathematical formulas (1) to (5) will be explained.

Mathematical formula (1) prescribes the entire length of the pickup lens 1. When the value obtained by mathematical formula (1) is larger than the upper limit value of 1.4, the entire length of the pickup lens 1 becomes too long, leading to difficulty in miniaturizing the product. On the other hand, when the value obtained by mathematical formula (1) is smaller than the lower limit value of 0.7, radiuses of curvature of the respective lenses of the pickup lens 1 become too short, leading to difficulty in correcting optical aberrations as well as in processing the lenses, which undesirably produces high cost lenses.

Since the pickup lens 1 employing the present invention meets the condition of mathematical formula (1), the entire length can be reduced, and thus the pickup lens 1 can be easily built in a small-sized information equipment. Furthermore, since radiuses of curvature of the respective lenses are not too small, optical aberrations can be properly corrected as well as the lenses can be easily processed, which desirably produces low cost lenses.

Mathematical formula (2) prescribes the focal length "f2" of the second lens group 13. In the pickup lens 1, when the value obtained by mathematical formula (2) is smaller than the lower limit value of 0.05, the focal length "f2" of the second lens group 13 becomes too short and power of the second lens group 13 is too large, which makes it impossible to correct under of the spherical aberration raised in the second lens group 13 especially at the wide-angle end on the optical axis by using other lenses. On the other hand, in the pickup lens 1, when the value obtained by mathematical formula (2) is larger than the upper limit value of 3.6, the focal length "f2" of the second lens group 13 becomes too long, and motion distance along the optical axis that is required to vary optical power is too long and thus the entire length of the pickup lens 1 becomes too long, which makes it difficult to build the pickup lens 1 in a small-sized information equipment.

Since the pickup lens 1 employing the present invention meets the condition of mathematical formula (2), the pickup lens 1 can be easily built in a small-sized information equipment. Furthermore, it becomes possible to properly correct under of the spherical aberration raised in the second lens group 13.

Mathematical formula (3) prescribes the difference between the Abbe's numbers of the lens L2 and the lens L3 forming the second lens group 13. In the pickup lens 1, when the difference between the Abbe's numbers obtained by mathematical formula (3) is smaller than 15, it becomes difficult to properly correct chromatic aberration on the optical axis.

Since the pickup lens 1 employing the present invention meets the condition of mathematical formula (3), that is the difference between the Abbe's numbers of the lens L2 and the lens L3 forming the second lens group 13 is 15 or more, it becomes possible to properly correct chromatic aberration on the optical axis.

Mathematical formula (4) prescribes the focal length "f1" of the first lens group 11. In a zoom lens, in which a lens group having negative power is firstly arranged from the subject side, the firstly arranged lens group needs to have comparatively large power. As for the first lens group 11, since off-axis light of the highest position passes through the subject side surface, which is arranged most closely to a subject, for designing reasons, it is desired that the direction of the off-axis light not be drastically changed and the image side surface, where the height of the off-axis light is lowered, have large negative power. In the pickup lens 1, when the value obtained by mathematical formula (4) is smaller than the lower limit value of 0.8, the focal length "f1" of the first lens group 11 becomes too short, and power of the image side surface of the first lens group 11 is too large, which makes it difficult to correct various aberrations even if the surface is aspherical. On the other hand, in the pickup lens 1, when the value obtained by mathematical formula (4) is larger than the upper limit value of 10.3, the focal length "f1" of the first lens group 11 becomes long. In this case, even if desirable configuration is achieved in view of aberration correction since power of the image side surface of the first lens group 11 is reduced, consequently, the second lens group 13 and the third lens group 14 need to have high optical power, and motion distance of the second lens group 13 along the optical axis to secure desired variable power ratio is too long, leading to difficulty in miniaturizing the product.

Since the pickup lens 1 employing the present invention meets the condition of mathematical formula (4), even if the image side surface of the first lens group 11 has large power, optical aberrations can be properly corrected as well as the entire length of the pickup lens 1 does not become too long, thus the pickup lens 1 can be easily built in a small-sized information equipment.

Mathematical formula (5) prescribes optical power M3 of the third lens group 14. In the pickup lens 1, when the value obtained by mathematical formula (5) is larger than the upper limit value of 4.3, the optical power M3 of the third lens group 14 becomes too large, and the focal length "f1" of the first lens group 11 becomes too short, which increases the negative distortion aberration, leading to difficulty in correcting the distortion aberration. On the other hand, in the pickup lens 1, when the value obtained by mathematical formula (5) is smaller than the lower limit value of 1.3, the optical power M3 of the third lens group 14 becomes too small, and the focal length "f1" of the first lens group 11 becomes too long, accordingly the focal length "f2" of the second lens group 13 has to be shortened, which increases aberration variation due to variable power, leading to difficulty in Correcting aberrations.

Since the pickup lens 1 employing the present invention meets the condition of mathematical formula (5), the focal length "f1" of the first lens group 11 is set to be in a proper range, which can properly correct the negative distortion aberration, and also the focal length "f2" of the second lens group 13 is set to be in a proper range, which reduces aberration variation due to variable power and can properly correct aberrations.

In the pickup lens 1 employing the present invention, since the diaphragm 12 is arranged at the subject side of the second lens group 13, the eye point distance can be elongated as well as the entrance pupil position gets closer to a subject. Thus, in the pickup lens 1, position on the first lens group 11 through which off-axis light passes becomes low, so the radius of a front lens can be shortened.

On the other hand, so as to prevent shading, it is necessary for a lens for use to pickup images to cause off-axis light to come into an image pickup device with the incident angle set to be small. Furthermore, of the lens groups, the first lens group 11 is a lens group through which light of the highest position passes. Thus, in case the diaphragm gets closer to an image as compared with the case of the present embodiment, position on the first lens group 11 into which off-axis light comes becomes high, which undesirably increases the volume of the lens.

In the pickup lens 1 employing the present invention, since the diaphragm 12 is fixed to the subject side of the second lens group 13, and is moved along the optical axis together with the second lens group 13, above-described problem can be solved.

In the pickup lens 1 employing the present invention, the second lens group 13 is a cemented lens composed of a lens whose both surfaces are convex and a meniscus lens having negative power whose convex surface faces the image side. Thus, the pickup lens 1 can properly correct the spherical aberration in the entire variable power range. For example, in case the lens L2 and the lens L3 of the second lens group 13 are independently formed, the spherical aberration becomes excessively under, which makes it difficult to correct the under by using other lenses. Furthermore, in the pickup lens 1, since the difference between the Abbe's numbers of the lens L2 and the lens L3 is set up, it becomes possible to properly correct chromatic aberration on the optical axis.

In the pickup lens 1 employing the present invention, since the third lens group 14 is the lens L4 having negative power, the back focal distance can be reduced. Furthermore, under the relation of the power-varying lens 13 having positive power on the whole and the correction lens 14 having negative power, the optical system is of telephoto-type configuration regionally, which can effectively reduce the entire length of the pickup lens 1.

Next, parameters of the respective lenses of the pickup lens 1 will be shown.

In the following explanation, "Li" indicates the "i"-th lens from the subject side, "Si" indicates the "i"-th surface from the subject side, "ri" indicates the radius of curvature of the "Si" surface, "di" indicates the distance between the "i"-th surface and the "i+1"-th surface both from the subject side, "ni" indicates the refraction index at the d-line (wave length of 587.6 nm) of the "i"-th lens "Li", "nFL" indicates the refraction index at the d-line of the filter 15, "vi" indicates the Abbe's number at the d-line of the "i"-th lens "Li", and "vFL" indicates the Abbe's number at the d-line of the filter 15.

The aspherical surface is obtained by the following equation (6), in which the direction of the optical axis is set to be the "X" axis, the direction perpendicular to the optical axis is set to be the "Y" axis, "K" indicates the conical constant, "R" indicates the radius of curvature, and "a", "b", "c", "d" indicate the fourth, sixth, eighth, tenth aspherical surface constants, respectively.

$$X = \frac{Y^2}{R\left(\sqrt{1 - \frac{(K+1)Y^2}{R^2}} + 1\right)} + aY^4 + bY^6 + cY^8 + dY^{10} \quad (6)$$

The pickup lens 1 has its first surface S1, second surface S2, fourth surface S4, sixth surface S6, seventh surface S7, and eighth surface S8 made aspherical. The pickup lens 1 performs focusing or corrects the focus to cope with movement of the subject by using any of the lens groups, and a mechanism to perform pan-focus may be provided.

The pickup lens 1 has its focal length "f" varied from 2.5 mm to 7.0 mm when the second lens group 13 is moved from the wide-angle end to the telephoto end. Furthermore, the pickup lens 1 has its F-number varied from 2.94 to 5.2 and has its half angle "ω" varied from 33.4° to 13.3° when the second lens group 13 is moved from the wide-angle end to the telephoto end.

Table 1 shows parameters of the pickup lens 1.

TABLE 1

| Surface | ri(mm) | di(mm) | ni | Ni | k | a4 | a6 | a8 | a10 |
|---|---|---|---|---|---|---|---|---|---|
| S1 | r1 = 4.38939 | d1 = 0.6 | n1 = 1.743 | v1 = 49.3 | −22.6750 | 0.013633 | −0.0095523 | 0.0038457 | −0.0004440 |
| S2 | r2 = 1.36323 | d2 = *1 | −0.9832 | | | 0.010734 | 0.0071914 | −0.0031446 | 0.0074011 |
| S3 | r3 = | d3 = 0.2 | | | | | | | |

TABLE 1-continued

| | ∞(diaphragm) | | | | | | | | |
|---|---|---|---|---|---|---|---|---|---|
| S4 | r4 = 2.09741 | d4 = 1.4 | n2 = 1.806 | v2 = 40.9 | 0.9348 | −0.028434 | 0.0034885 | −0.0119050 | 0.0031561 |
| S5 | r5 = −1.62401 | d5 = 0.5 | n3 = 1.847 | v3 = 23.8 | | | | | |
| S6 | r6 = −3.52595 | d7 = *2 | | | 1.4505 | −0.013434 | 0.0317070 | −0.0274730 | 0.0113350 |
| S7 | r7 = −66.2732 | d8 = 0.538 | n4 = 1.847 | v4 = 23.8 | 0.0000 | −0.192260 | 0.0378020 | 0.0871270 | −0.0659800 |
| S8 | r8 = 2.06071 | d9 = *3 | | | 1.4175 | −0.183900 | 0.1419000 | 0.0142650 | −0.0741580 |
| S9 | r9 = ∞(filter) | d10 = 0.5 | n5 = 1.517 | vFL = 64.2 | | | | | |
| S10 | r10 = ∞(filter) | d11 = *4 | | | | | | | |

| | d2 = *1 | d7 = *2 | d9 = *3 | d11 = fb | m2 | m3 |
|---|---|---|---|---|---|---|
| Wide-angle end fw = 2.5 | 3.16 | 0.53 | 0.97 | 1.1 | −0.43 | 2.01 |
| Midpoint fm = 4.0 | 1.99 | 0.61 | 2.06 | 1.1 | −0.57 | 2.43 |
| Telephoto end ft = 7.0 | 0.8 | 1.1 | 2.76 | 1.1 | −0.88 | 2.77 |

FIG. 4 to FIG. 12 show optical property of the pickup lens 1 having above-shown parameters.

Figure 4:
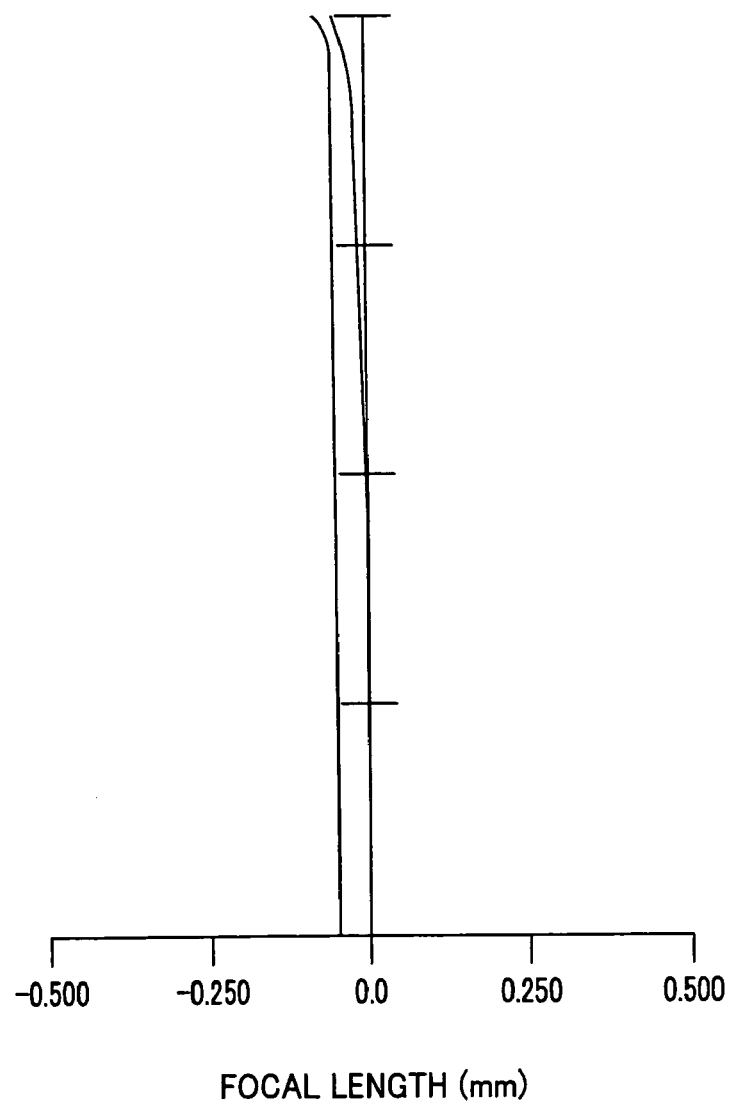
FIG. 4 shows a view indicative of aberration of the zoom lens, or measurement result of the spherical aberration when a power-varying lens is located at wide-angle end.
Figure 5:
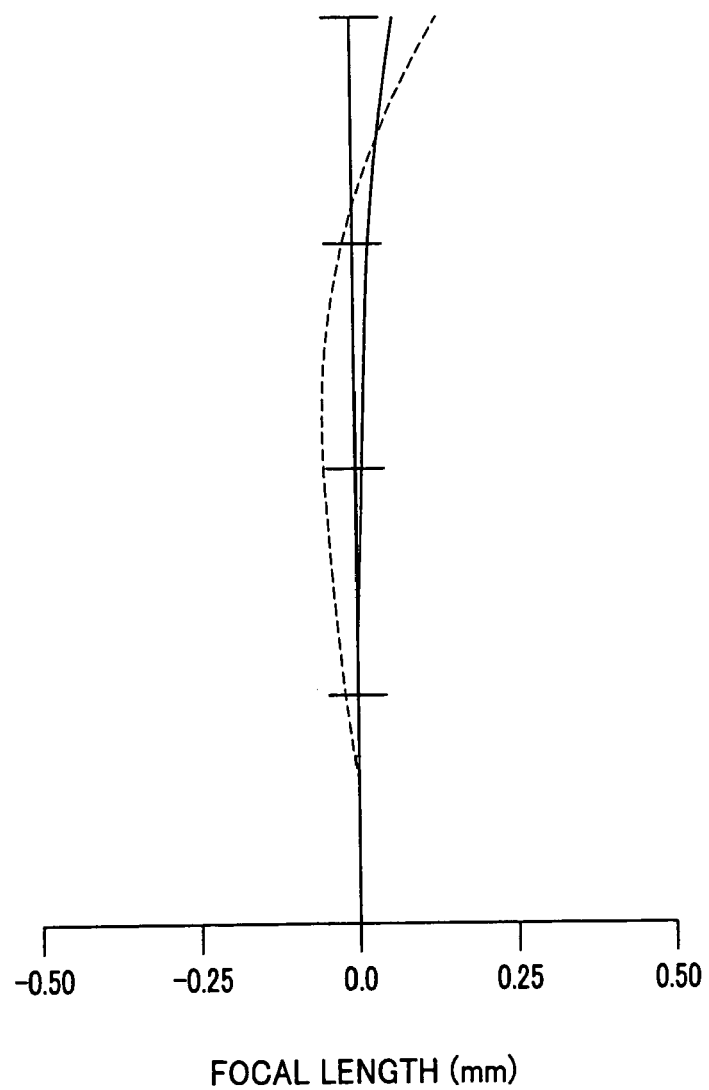
FIG. 5 shows a view indicative of aberration of the zoom lens, or measurement result of the astigmatism when a power-varying lens is located at wide-angle end.
Figure 6:
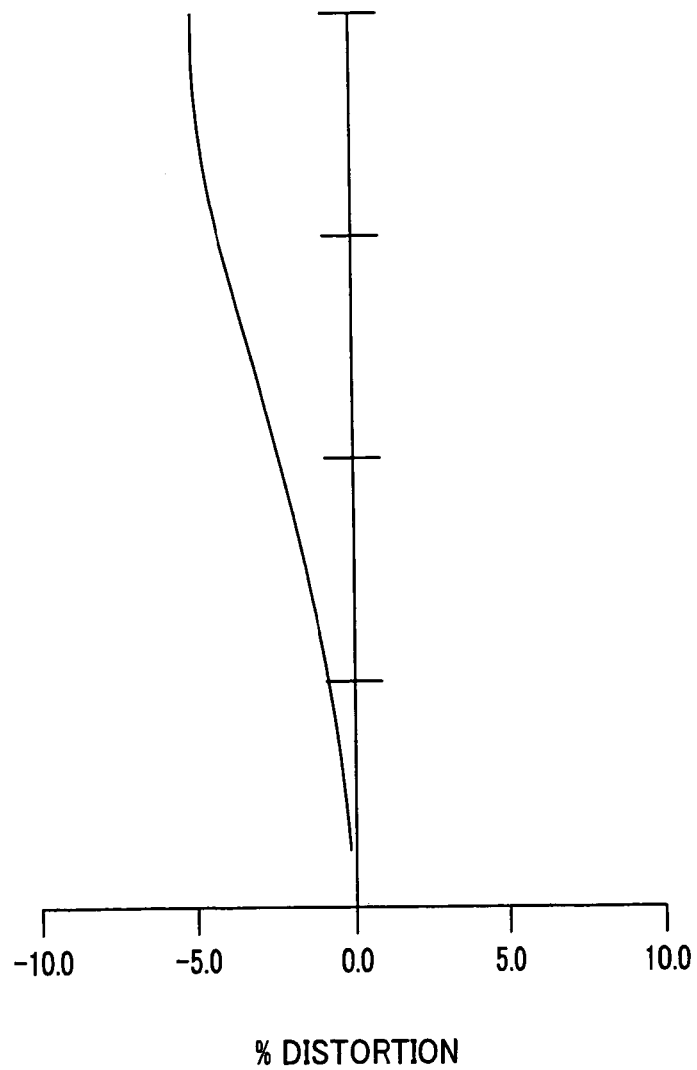
FIG. 6 shows a view indicative of aberration of the zoom lens, or measurement result of the distortion aberration when a power-varying lens is located at wide-angle end.

FIG. 4 to FIG. 6 show views of the spherical aberration, astigmatism, and distortion aberration of the pickup lens 1 when the second lens group 13 is located at the wide-angle end, that is, when the focal length "f" is 2.5 mm.

Figure 7:
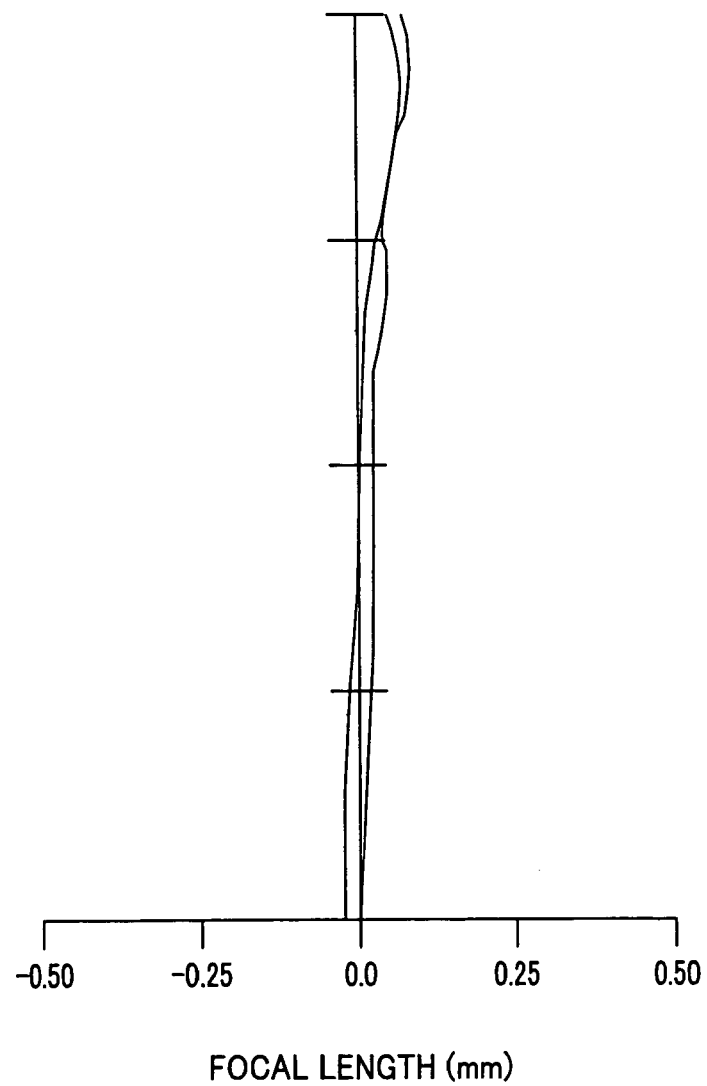
FIG. 7 shows a view indicative of aberration of the zoom lens, or measurement result of the spherical aberration when a power-varying lens is located between wide-angle end and telephoto end, as shown in FIG. 2.
Figure 8:
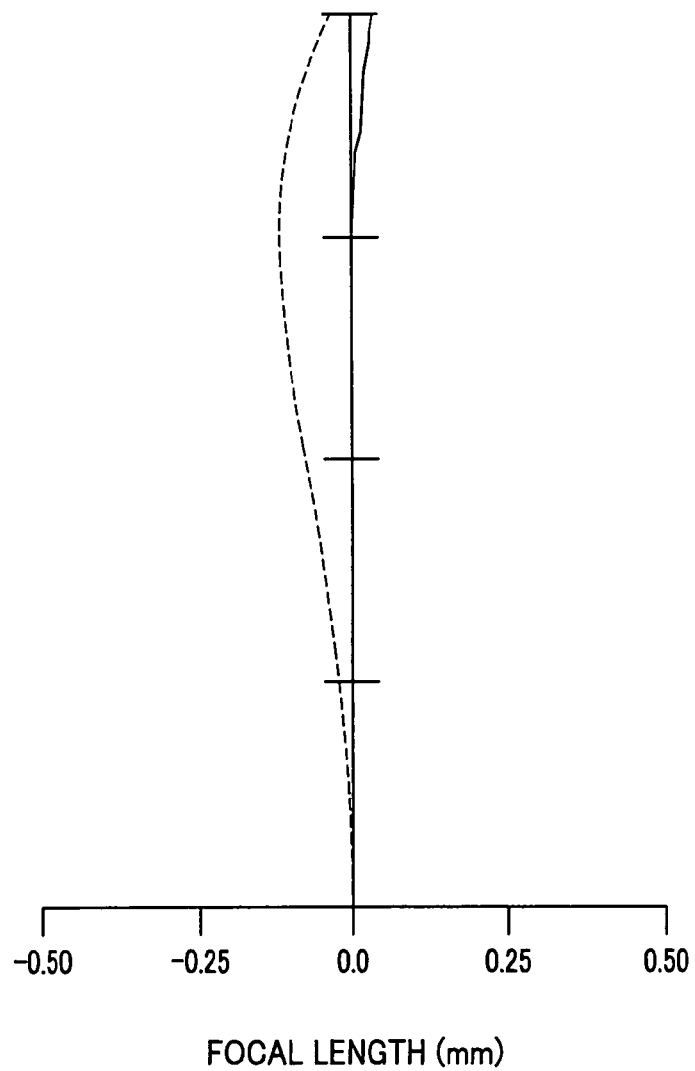
FIG. 8 shows a view indicative of aberration of the zoom lens, or measurement result of the astigmatism when a power-varying lens is located between wide-angle end and telephoto end, as shown in FIG. 2.
Figure 9:
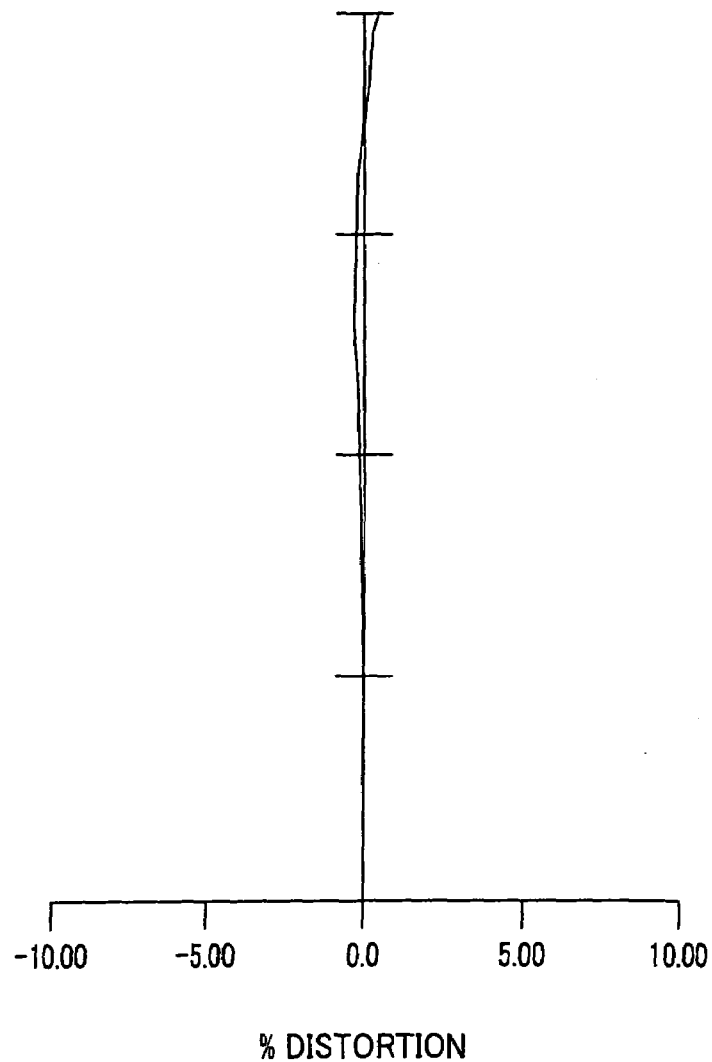
FIG. 9 shows a view indicative of aberration of the zoom lens, or measurement result of the distortion aberration when a power-varying lens is located between wide-angle end and telephoto end, as shown in FIG. 2.

FIG. 7 to FIG. 9 show views of the spherical aberration, astigmatism, and distortion aberration of the pickup lens 1 when the second lens group 13 is located between the wide-angle end and the telephoto end, that is, when the focal length "f" is 4.0 mm.

Figure 10:
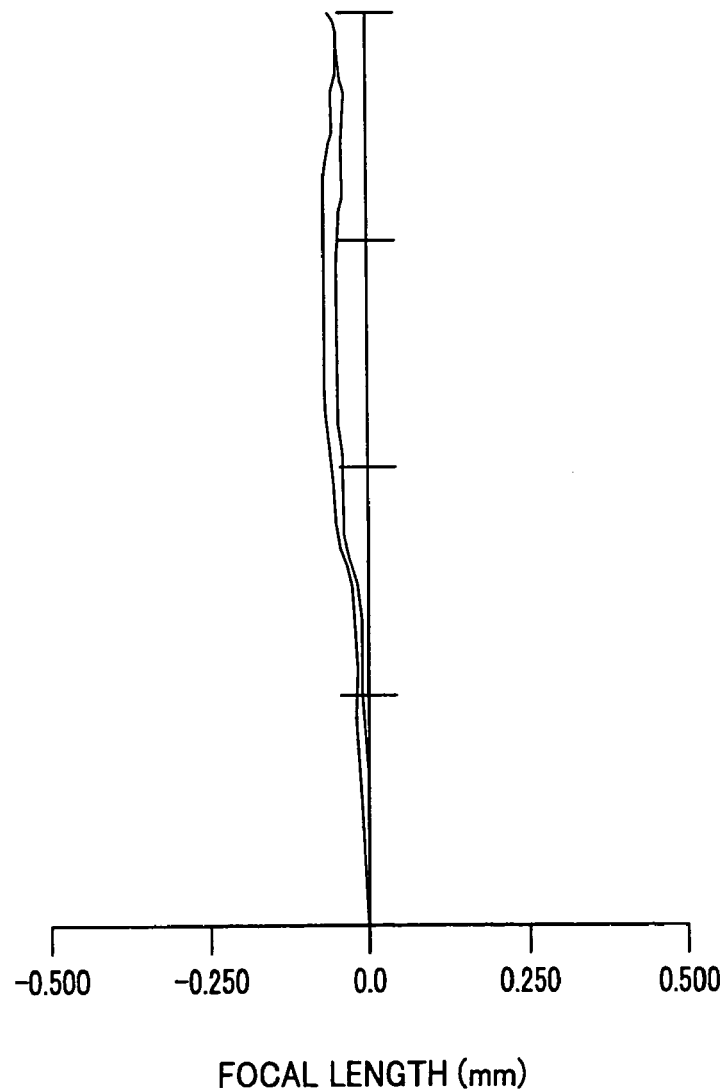
FIG. 10 shows a view indicative of aberration of the zoom lens, or measurement result of the spherical aberration when a power-varying lens is located at telephoto end.
Figure 11:
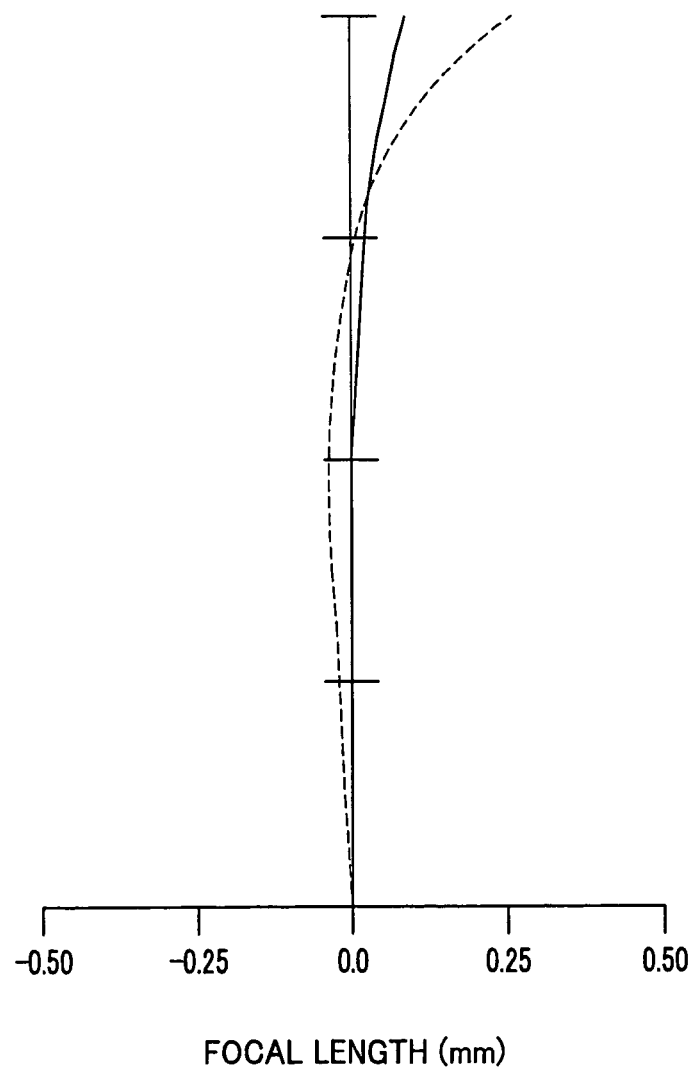
FIG. 11 shows a view indicative of aberration of the zoom lens, or measurement result of the astigmatism when a power-varying lens is located at telephoto end.
Figure 12:
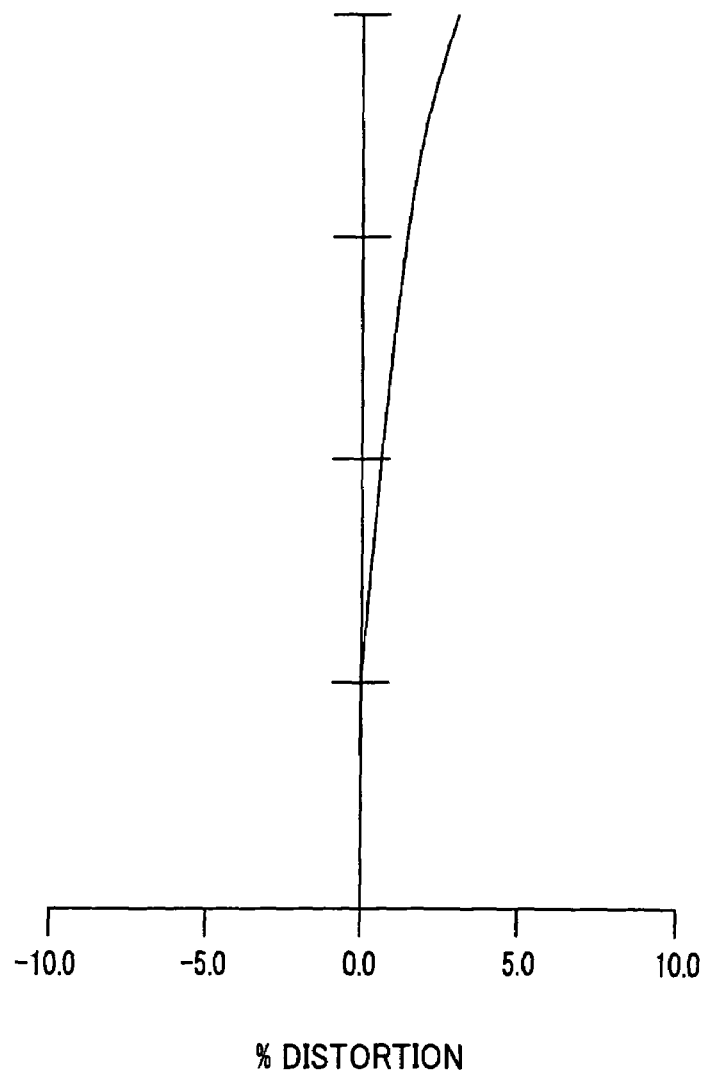
FIG. 12 shows a view indicative of aberration of the zoom lens, or measurement result of the distortion aberration when a power-varying lens is located at telephoto end.

FIG. 10 to FIG. 12 show views of the spherical aberration, astigmatism, and distortion aberration of the pickup lens 1 when the second lens group 13 is located at the telephoto end, that is, when the focal length "f" is 7.0 mm.

In the spherical aberration views shown in FIG. 4, FIG. 7, and FIG. 10, full line shows the value at the d-line and dotted line shows the value at the g-line, while in the astigmatism views shown in FIG. 5, FIG. 8, and FIG. 11, full line shows the value at the sagittal image surface and dotted line shows the value at the meridional image surface.

As is apparent from FIG. 4 to FIG. 12, in the pickup lens 1 employing the present invention, respective optical aberrations are properly corrected.

SECOND EMBODIMENT

Figure 13:
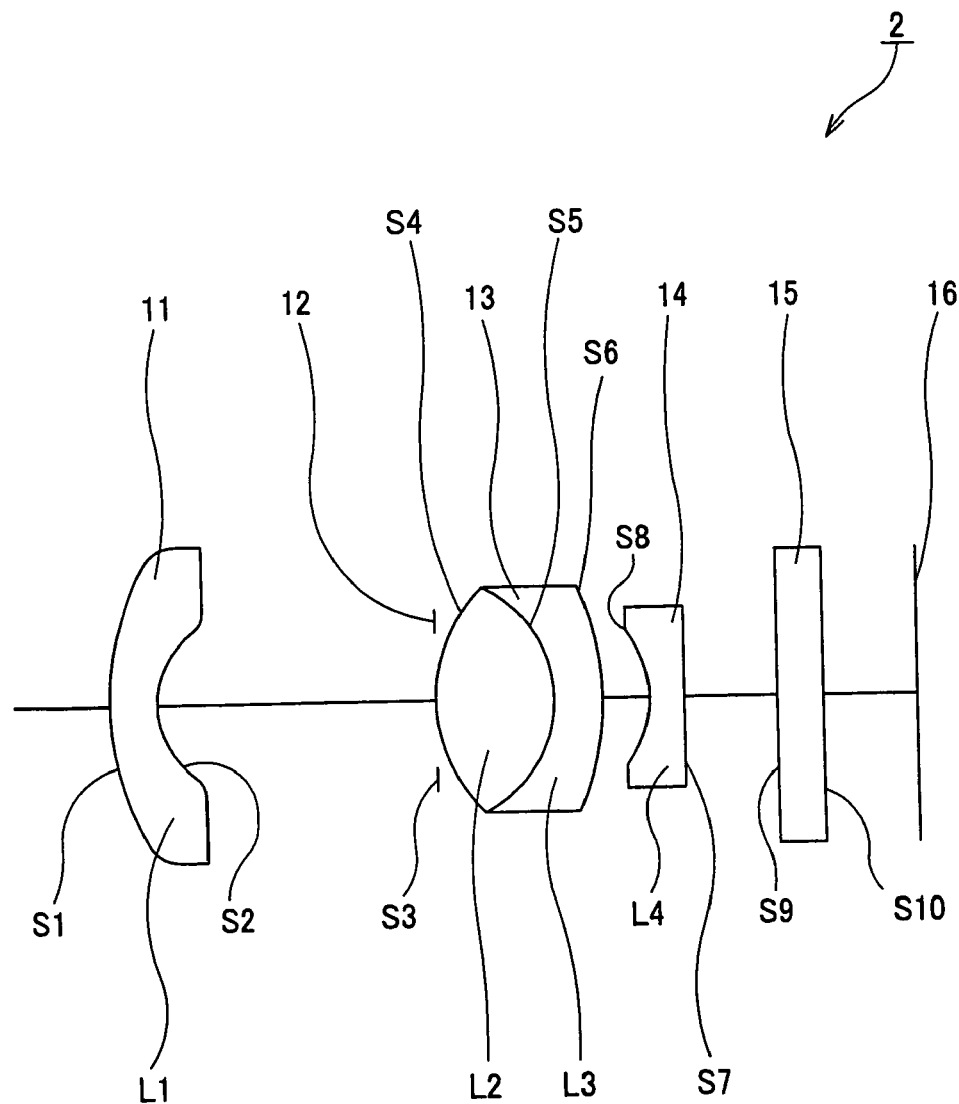
FIG. 13 shows a side view for explaining a zoom lens of the second embodiment employing the present invention, in which a power-varying lens is located at wide-angle end.
Figure 14:
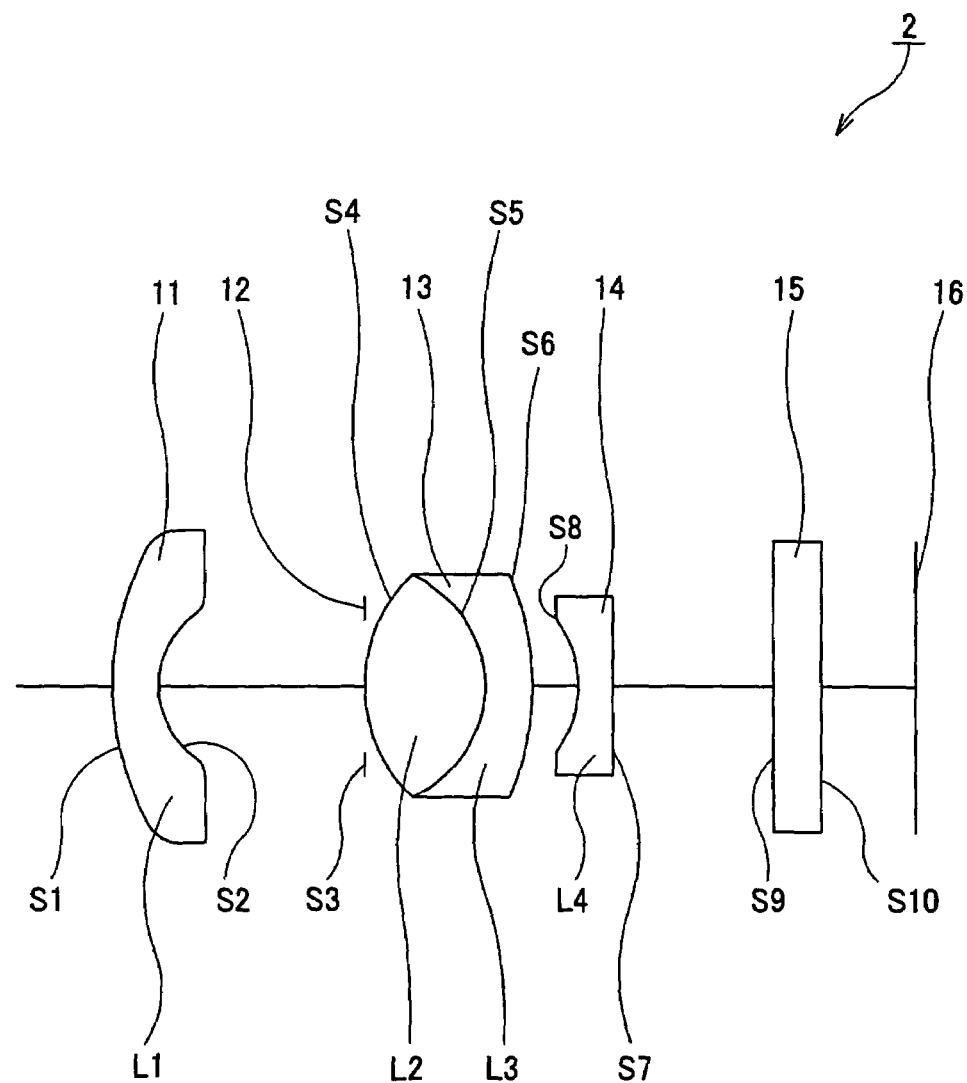
FIG. 14 shows a side view for explaining the zoom lens of the second embodiment, in which a power-varying lens is located between wide-angle end and telephoto end.
Figure 15:
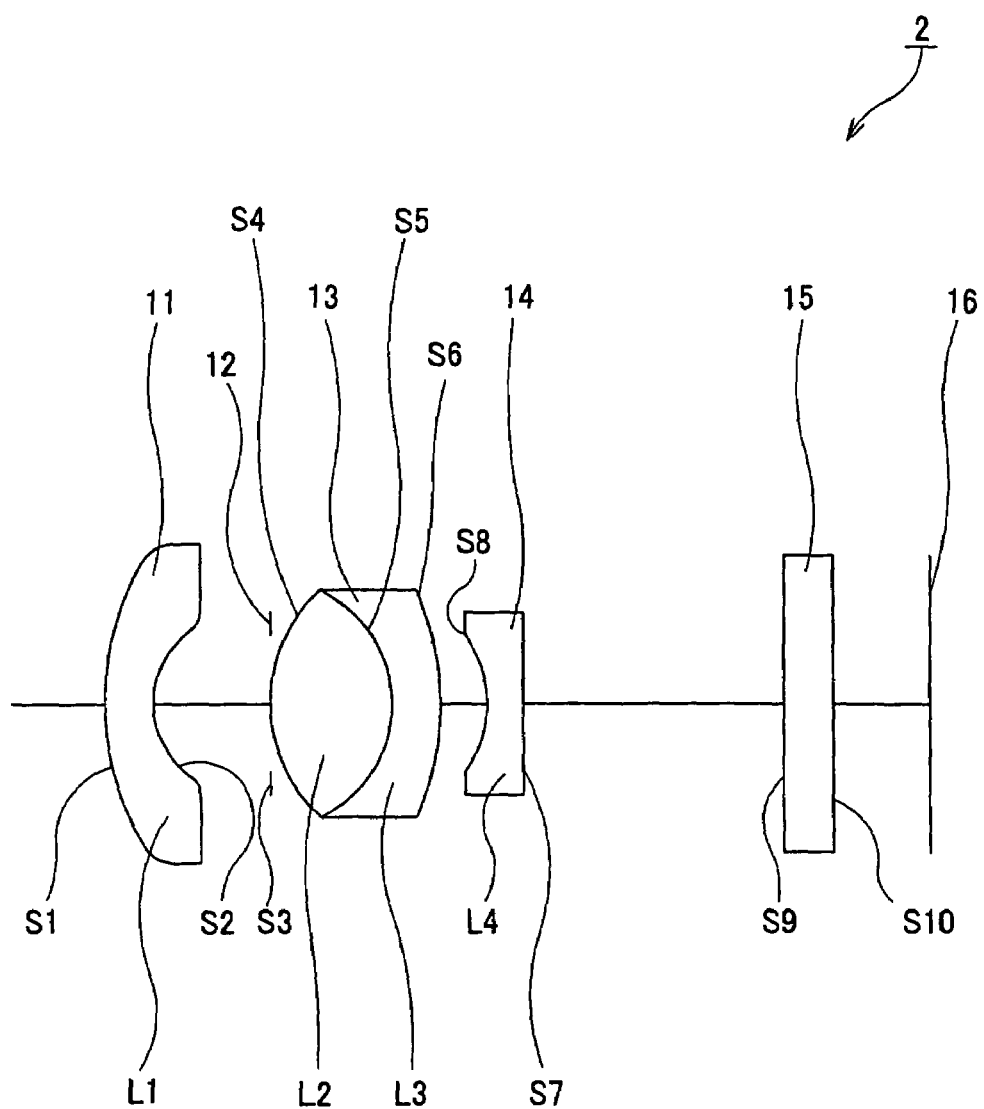
FIG. 15 shows a side view for explaining the zoom lens of the second embodiment, in which a power-varying lens is located at telephoto end.

Next, the second embodiment of the pickup lens employing the present invention will be explained referring to FIG. 13 to FIG. 15.

In the following explanation, parts or components similar to those of the pickup lens 1 of the first embodiment are indicated with the same reference numerals and detailed explanation of which will be omitted, and the difference between parameters of respective lenses alone will be explained.

Similar to the pickup lens 1 of the first embodiment, the pickup lens 2 of the second embodiment can have its optical power varied by moving the second lens group 13 along the optical axis. Similar to FIG. 1 to FIG. 3, FIG. 13 shows the lens alignment in which the second lens group 13 is located at the wide-angle end, FIG. 15 shows the lens alignment in which the second lens group 13 is located at the telephoto end, and FIG. 14 shows the lens alignment in which the second lens group 13 is located between the wide-angle end and the telephoto end, respectively.

The pickup lens 2 has its first surface S1, second surface S2, fourth surface S4, sixth surface S6, and eighth surface S8 made aspherical. The pickup lens 2 performs focusing or corrects the focus to cope with movement of the subject by using any of the lens groups, and a mechanism to perform pan-focusing may be provided.

The pickup lens 2 has its focal length "f" varied from 2.2 mm to 4.4 mm when the second lens group 13 is moved from the wide-angle end to the telephoto end. Furthermore, the pickup lens 2 has its F-number varied from 2.88 to 3.9 and has its half angle "ω" varied from 36.9° to 20.6° when the second lens group 13 is moved from the wide-angle end to the telephoto end.

Table 2 shows parameters of the pickup lens 2.

TABLE 2

| Surface | ri(mm) | di(mm) | ni | vi | k | a4 | a6 | a8 | a10 |
|---|---|---|---|---|---|---|---|---|---|
| S1 | r1 = 1.80339 | d1 = 0.6 | n1 = 1.755 | v1 = 45.6 | −2.8657 | 0.0068484 | −0.0159070 | 0.0023924 | 0.0006707 |
| S2 | r2 = 0.75337 | d2 = *1 | | | −0.5431 | −0.1378200 | 0.0948830 | −0.3115500 | 0.1277600 |
| S3 | r3 = ∞(diaphragm) | d3 = 0.2 | | | | | | | |
| S4 | r4 = 1.82154 | d4 = 1.2 | n2 = 1.806 | v2 = 40.9 | 0.2725 | −0.0172340 | −0.0260440 | 0.0022771 | 0.0060925 |
| S5 | r5 = −1.3 | d5 = 0.5 | n3 = 1.839 | v3 = 23.9 | | | | | |
| S6 | r6 = −2.40189 | d6 = *2 | | | 1.1227 | 7.3109000 | −0.0024448 | −0.0008073 | 0.0108180 |
| S7 | r7 = −1.32327 | d7 = 0.5 | n4 = 1.839 | v4 = 23.9 | | | | | |
| S8 | r8 = −3.0371 | d8 = *3 | | | 0 | 0.0683060 | −0.0627140 | 0.1935400 | −0.1291000 |
| S9 | r9 = ∞(filter) | d9 = 0.5 | n5 = 1.517 | v5 = 64.2 | | | | | |
| S10 | r10 = ∞(filter) | d10 = *4 | | | | | | | |

| | d1 = *1 | d2 = *2 | d3 = *3 | d4 = fb | m2 | m3 |
|---|---|---|---|---|---|---|
| Wide-angle end fw = 2.2 | 2 ~ | 0.5 | 0.5 | 1.41 | −0.52 | 1.87 |
| Midpoint fm = 3.1 | 1.33 | 0.58 | 1.09 | 1.41 | −0.67 | 2.05 |
| Telephoto end ft = 4.4 | 0.71 | 0.87 | 1.42 | 1.41 | −0.9 | 2.16 |

FIG. 16 to FIG. 24 show optical property of the pickup lens 2 having above-shown parameters.

Figure 16:
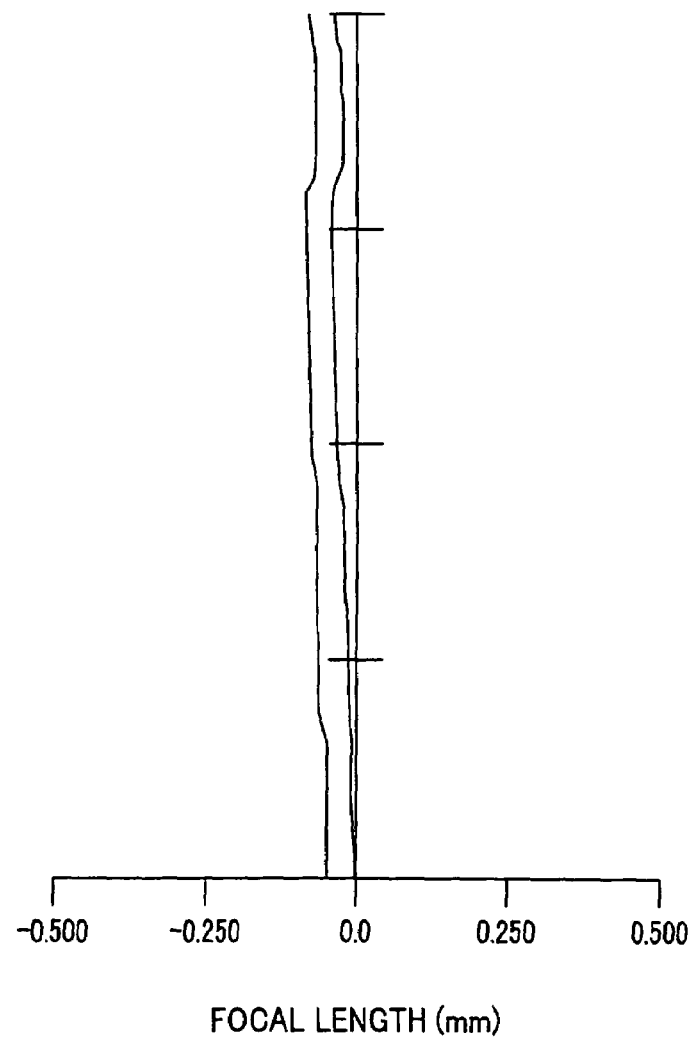
FIG. 16 shows a view indicative of aberration of another zoom lens, or measurement result of the spherical aberration when a power-varying lens is located at wide-angle end.
Figure 17:
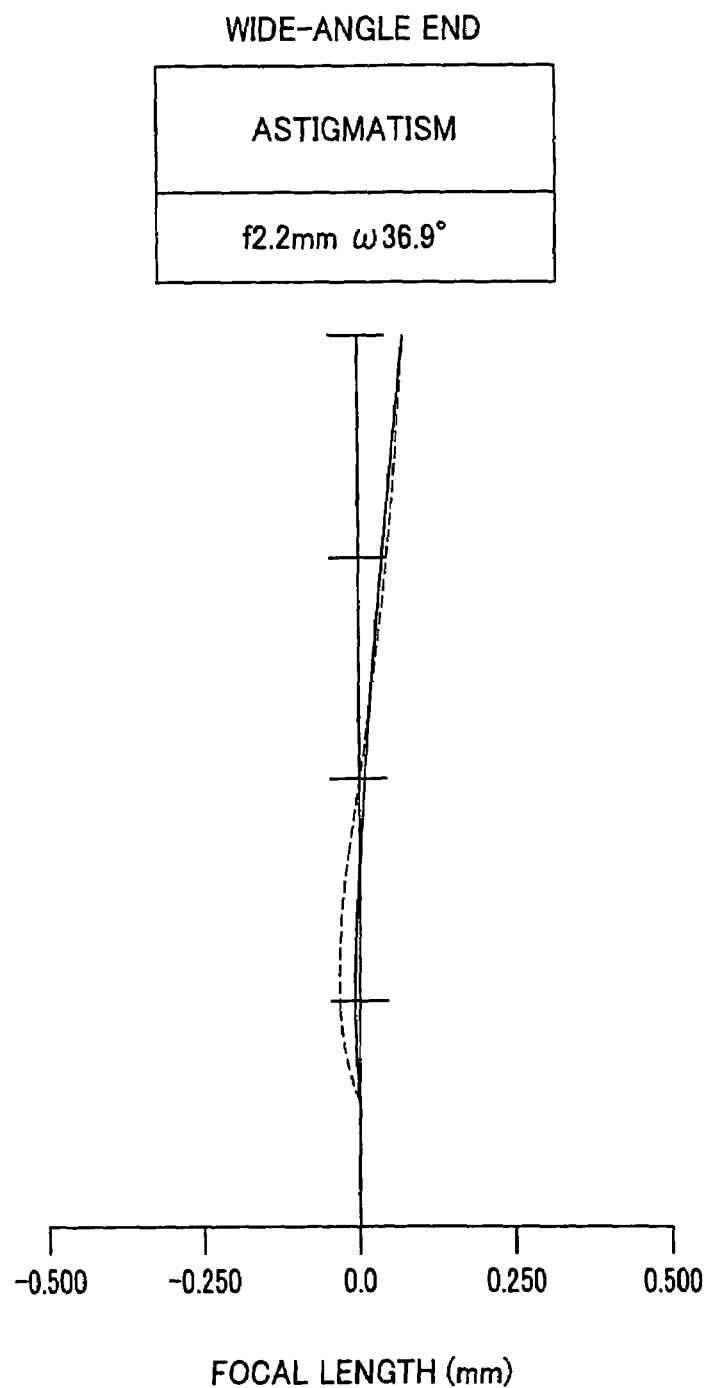
FIG. 17 shows a view indicative of aberration of another zoom lens, or measurement result of the astigmatism when a power-varying lens is located at wide-angle end.
Figure 18:
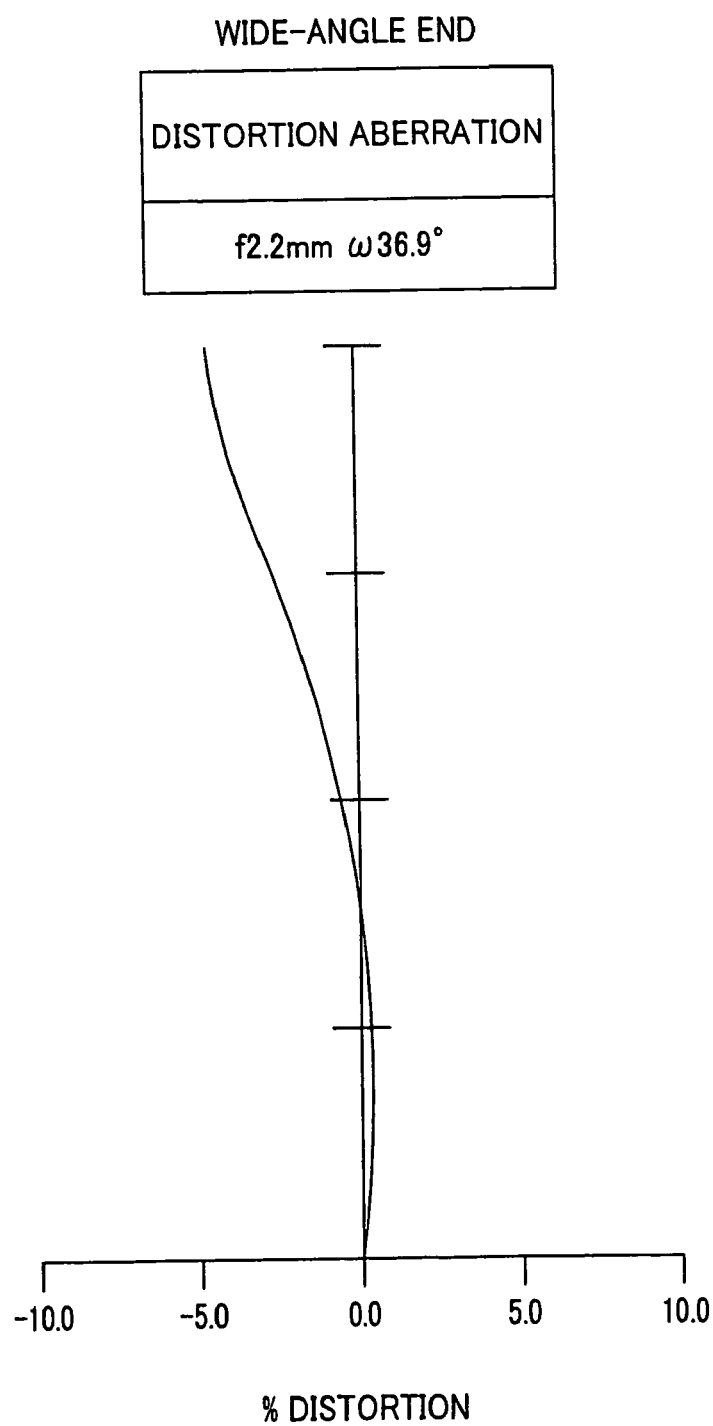
FIG. 18 shows a view indicative of aberration of another zoom lens, or measurement result of the distortion aberration when a power-varying lens is located at wide-angle end.

FIG. 16 to FIG. 18 show views of the spherical aberration, astigmatism, and distortion aberration of the pickup lens 2 when the second lens group 13 is located at the wide-angle end, that is, when the focal length "f" is 2.2 mm.

Figure 19:
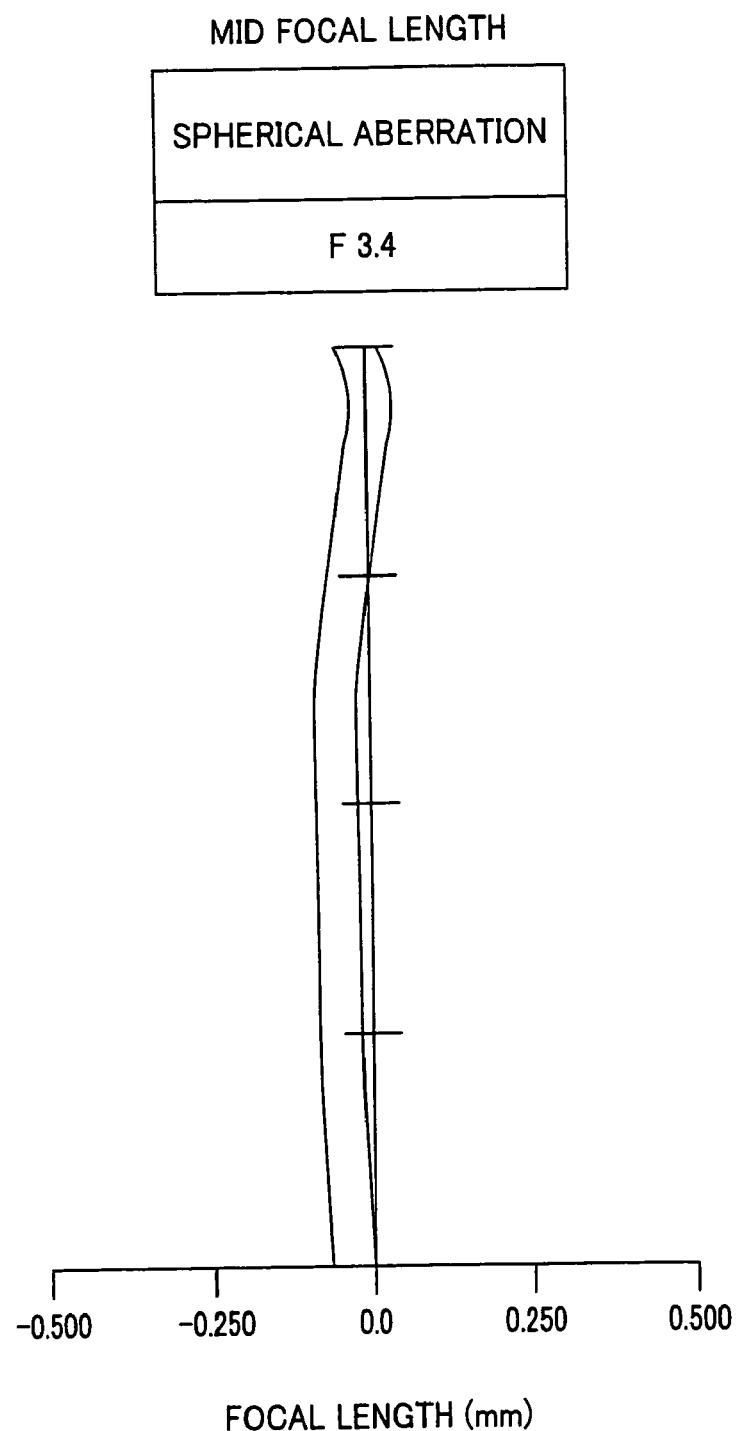
FIG. 19 shows a view indicative of aberration of another zoom lens, or measurement result of the spherical aberration when a power-varying lens is located between wide-angle end and telephoto end, as shown in FIG. 14.
Figure 20:
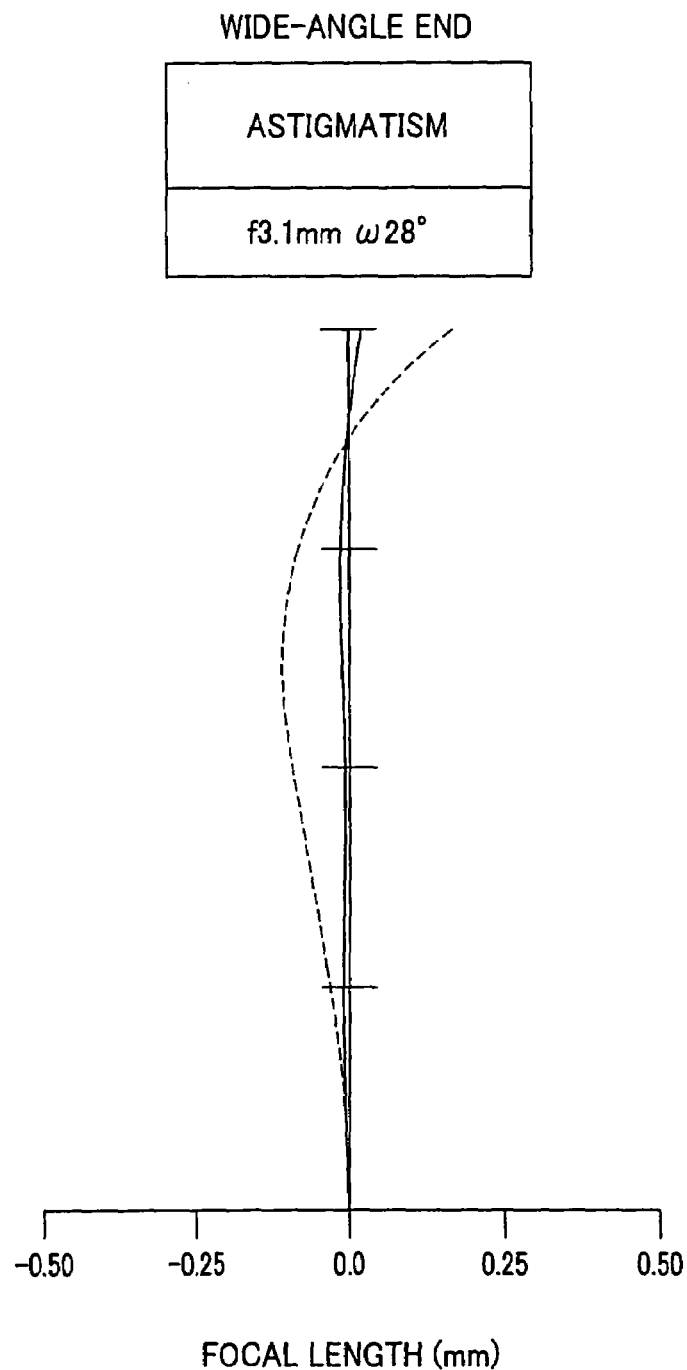
FIG. 20 shows a view indicative of aberration of another zoom lens, or measurement result of the astigmatism when a power-varying lens is located between wide-angle end and telephoto end, as shown in FIG. 14.
Figure 21:
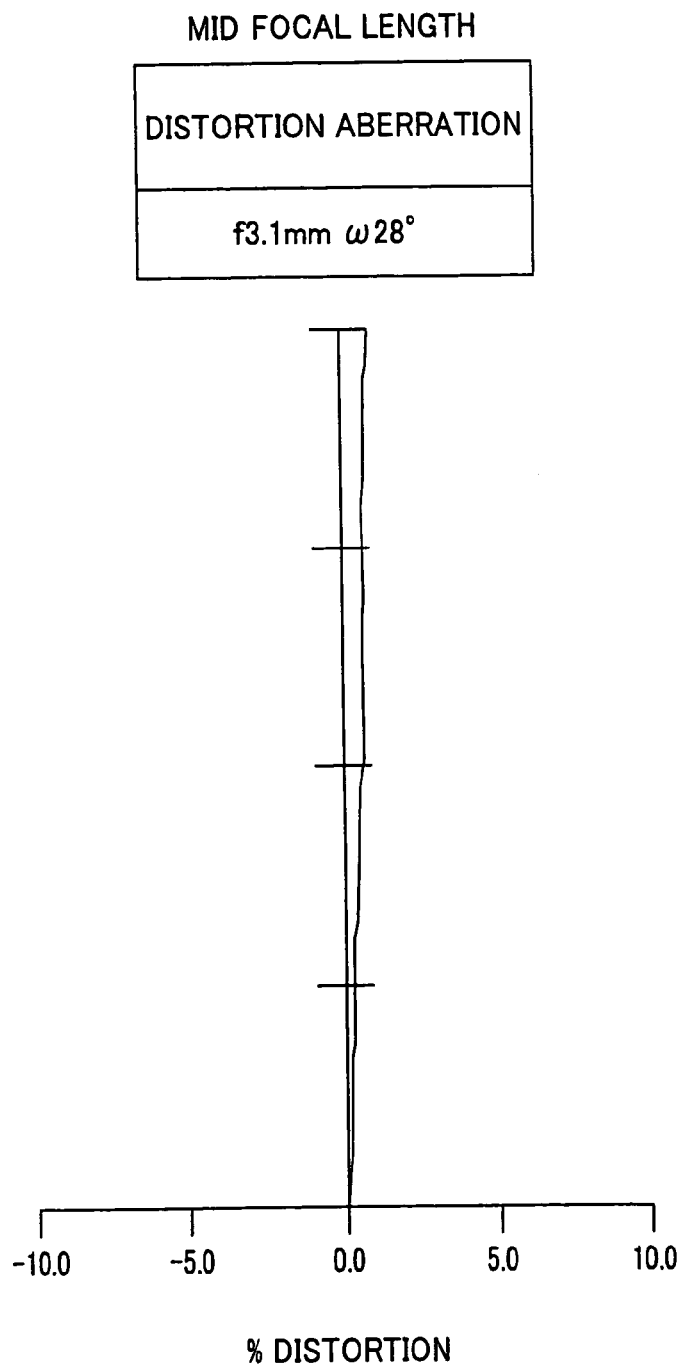
FIG. 21 shows a view indicative of aberration of another zoom lens, or measurement result of the distortion aberration when a power-varying lens is located between wide-angle end and telephoto end, as shown in FIG. 14.

FIG. 19 to FIG. 21 show views of the spherical aberration, astigmatism, and distortion aberration of the pickup lens 2 when the second lens group 13 is located between the wide-angle end and the telephoto end, that is, when the focal length "f" is 3.1 mm.

Figure 22:
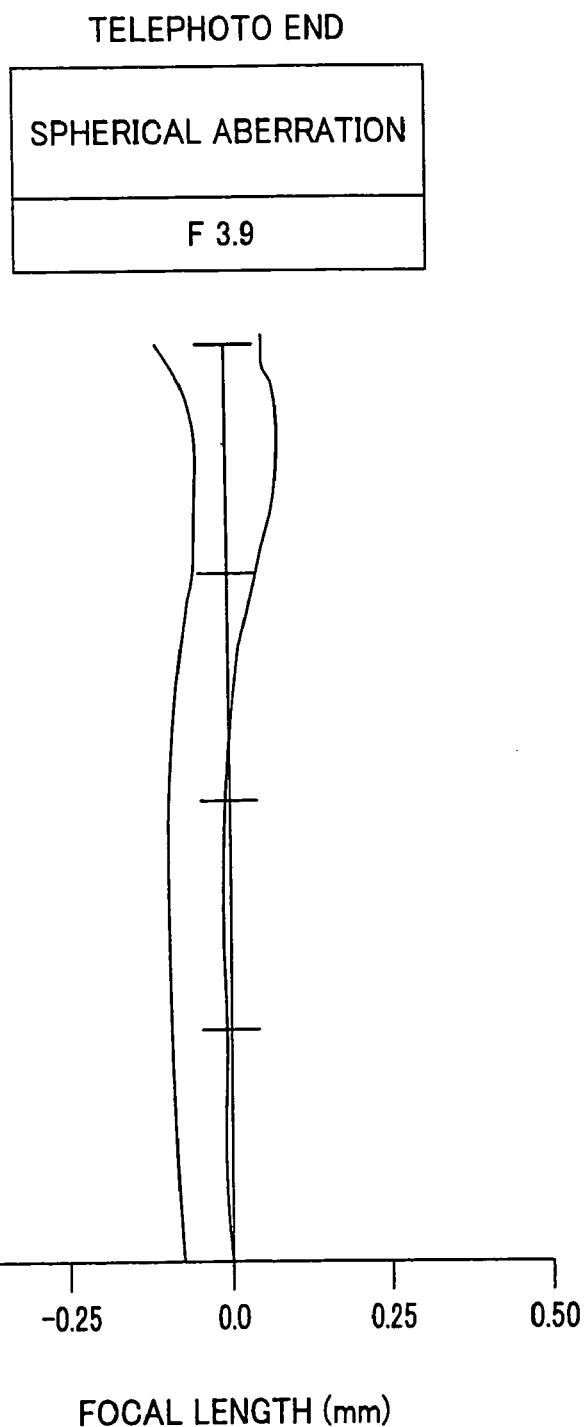
FIG. 22 shows a view indicative of aberration of another zoom lens, or measurement result of the spherical aberration when a power-varying lens is located at telephoto end.
Figure 23:
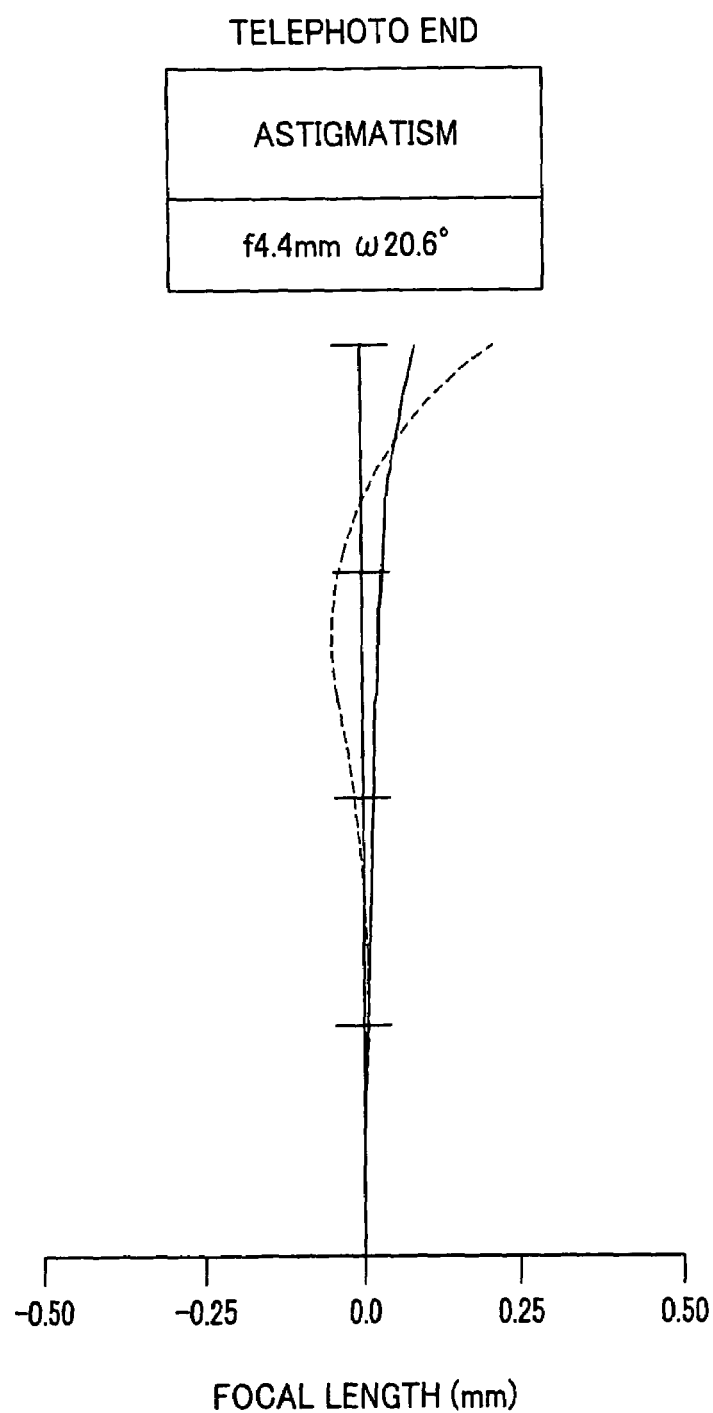
FIG. 23 shows a view indicative of aberration of another zoom lens, or measurement result of the astigmatism when a power-varying lens is located at telephoto end.
Figure 24:
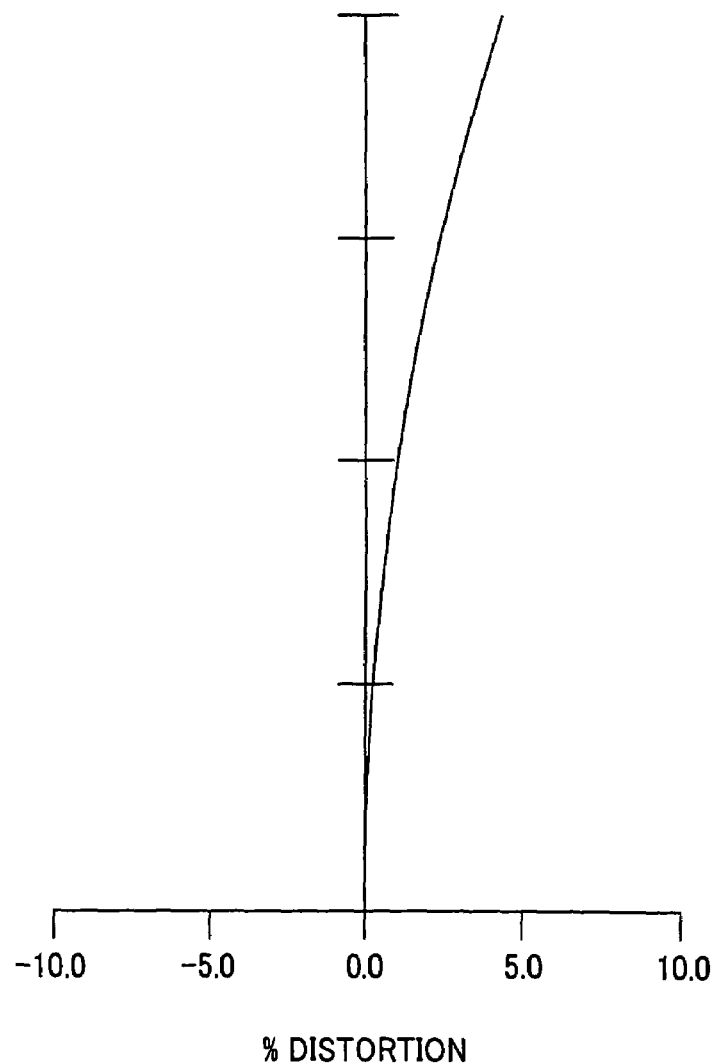
FIG. 24 shows a view indicative of aberration of another zoom lens, or measurement result of the distortion aberration when a power-varying lens is located at telephoto end.

FIG. 22 to FIG. 24 show views of the spherical aberration, astigmatism, and distortion aberration of the pickup lens 2 when the second lens group 13 is located at the telephoto end, that is, when the focal length "f" is 4.4 mm.

In the spherical aberration views shown in FIG. 16, FIG. 19, and FIG. 22, full line shows the value at the d-line and dotted line shows the value at the g-line, while in the astigmatism views shown in FIG. 17, FIG. 20, and FIG. 23, full line shows the value at the sagittal image surface and dotted line shows the value at the meridional image surface.

As is apparent from FIG. 16 to FIG. 24, in the pickup lens 2 employing the present invention, respective optical aberrations are properly corrected.

Table 2 shows the comparison of the first embodiment and the second embodiment.

TABLE 3

|  | First embodiment | Second embodiment |
|---|---|---|
| TT/Z/fw | 1.27 | 1.8 |
| f2/ft | 0.278 | 0.36 |
| δV | 17.1 | 17 |
| \|f1/fw\| | 1.15 | 1.03 |
| M3 | 2.01  2.77 | 1.87  2.16 |

As is apparent from Table 3 and optical aberrations shown in FIG. 4 to FIG. 12 and FIG. 16 to FIG. 24, the pickup lens 1 and the pickup lens 2, each of which is composed of only four lenses, have their entire lengths reduced, and have their optical aberrations properly corrected, and have high resolution, which can meet the requirement of a small-sized image pickup device. Specifically, entire lengths of the pickup lens 1 and the pickup lens 2, optical power of which are three times and two times zoom, are 9.5 mm and 7.9 mm, respectively. Furthermore, since the first lens group 11 is fixed when varying optical power, configuration of lenses is simple and stable, and the number of lenses to be moved is small, which can realize a small-sized zoom lens of low cost. So, the pickup lens 1 and the pickup lens 2 are properly used as a pickup lens of a small-sized information equipment for mobile use such as a digital camera or a cellular phone.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

INDUSTRIAL APPLICABILITY

The pickup lens employing the present invention is composed of only four lenses, and can properly correct various optical aberrations, forming a compact zoom lens.

The invention claimed is:

1. A pickup lens that takes in light coming from the side of a subject and sends out the light to the side of an image to form a subject image, whose optical power is variable, comprising:
    a first lens group being a meniscus lens having negative power, which is fixed when varying optical power;
    a second lens group having positive power, which is moved over a distance along the optical axis from the image side or the wide-angle end to the subject side or the telephoto end when varying optical power; and
    a third lens group having negative power, which is moved along the optical axis when varying optical power, the third lens group being the closest lens group to the image side;
    wherein the first lens group, the second lens group, and third lens group are arranged in this order from the subject side to the image side, and
    a diaphragm, which is moved together with the second lens group, is arranged between the first lens group and the second lens group or between the second lens group and third lens group.

2. The pickup lens as set forth in claim 1, wherein the first lens group has at least one of the subject side surface and the image side surface made aspherical.

3. The pickup lens as set forth in claim 1, wherein the second lens group has at least one of the subject side surface and the image side surface made aspherical.

4. The pickup lens as set forth in claim 1, wherein the second lens group is a cemented lens consisting of a lens having positive power and a lens having negative power to form a lens group having positive power on the whole.

5. The pickup lens as set forth in claim 1, wherein the third lens group has at least the image side surface made aspherical.

6. An apparatus comprising:
    a pickup lens that takes in light coming from the side of a subject and sends out the light to the side of an image to form a subject image, whose optical power is variable, including,
    a first lens group being a meniscus lens having negative power, which is fixed when varying optical power;
    a second lens group having positive power, which is moved over a distance along the optical axis from the image side or the wide-angle end to the subject side or the telephoto end when varying optical power; and
    a third lens group having negative power, which is moved along the optical axis when varying optical power, the third lens group being the closest lens group to the image side;
    wherein the first lens group, the second lens group, and third lens group are arranged in this order from the subject side to the image side, and
    a diaphragm, which is moved together with the second lens group, is arranged between the first lens group and the second lens group or between the second lens group and third lens group.

7. The apparatus as set forth in claim 6, wherein the first lens group has at least one of the subject side surface and the image side surface made aspherical.

8. The apparatus as set forth in claim 6, wherein the second lens group has at least one of the subject side surface and the image side surface made aspherical.

9. The apparatus as set forth in claim 6, wherein the second lens group is a cemented lens consisting of a lens having positive power and a lens having negative power to form a lens group having positive power on the whole.

10. The apparatus as set forth in claim 6, wherein the third lens group has at least the image side surface made aspherical.

11. The pickup lens as set forth in claim 1, wherein the diaphragm is arranged between the first lens group and the second lens group.

12. The apparatus as set forth in claim 6, wherein the diaphragm is arranged between the first lens group and the second lens group.

* * * * *

UNITED STATES PATENT AND TRADEMARK OFFICE
CERTIFICATE OF CORRECTION

PATENT NO. : 7,068,447 B2
APPLICATION NO. : 10/495753
DATED : June 27, 2006
INVENTOR(S) : Nobuyuki Adachi It is certified that error appears in the above-identified patent and that said Letters Patent is hereby corrected as shown below:

Column 7, line 23, change "Correcting" to --correcting--.

Column 8, line 40, change "$by^6$" to --$bY^6$--.

Column 9, line 62, change "2~" to --2--.

Signed and Sealed this

Tenth Day of April, 2007

JON W. DUDAS
*Director of the United States Patent and Trademark Office*